US006581161B1

United States Patent
Byford

(10) Patent No.: US 6,581,161 B1
(45) Date of Patent: Jun. 17, 2003

(54) SYSTEM, APPARATUS AND METHOD FOR CONTROLLING ACCESS

(75) Inventor: Derrick John Byford, London (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/260,247

(22) Filed: Mar. 2, 1999

(30) Foreign Application Priority Data

Dec. 12, 1998 (GB) .............................................. 9827317

(51) Int. Cl.[7] .............................. H04L 9/32; G06F 12/14
(52) U.S. Cl. ........................ 713/182; 713/185; 713/186; 705/55
(58) Field of Search ......................... 713/186, 168–175, 713/182, 183, 185, 200, 201, 202; 705/52, 54, 57, 59; 380/201, 211; 455/450, 455, 464; 707/104

(56) References Cited

U.S. PATENT DOCUMENTS

| 5,321,242 A | * | 6/1994 | Heath, Jr. ..................... 235/382 |
| 5,872,588 A | * | 2/1999 | Aras et al. ....................... 348/1 |
| 5,894,472 A | * | 4/1999 | de Seze ........................ 370/337 |
| 6,038,666 A | * | 3/2000 | Hsu et al. .................... 713/186 |
| 6,065,120 A | * | 5/2000 | Laursen et al. ............. 713/201 |

FOREIGN PATENT DOCUMENTS

| GB | 2102996 A | 6/1982 | |
| GB | 2202354 A | 3/1988 | ........... E05B/47/00 |
| GB | 2300288 A | 12/1995 | ............. G06F/1/00 |
| WO | 9642041 A | 6/1996 | |

\* cited by examiner

*Primary Examiner*—Justin T. Darrow
(74) *Attorney, Agent, or Firm*—Edward H. Duffield

(57) ABSTRACT

A system, portable device, server, apparatus and method for controlling access to a secure location or container, or for controlling access to selected television programs or classes of programs. The invention provides a system for controlling access to a facility, comprising a portable communicating device, a server means, and one or more access control devices in communication across a network, data storage means available to said server means for storing access control data, said server means being adapted to receive access requests identifying a user of said portable communicating means and including: generating means within said server means for generating access criteria from said access control data according to said user's identity, and communicating means for communicating said access criteria to at least one of said access control means and said portable communicating means, wherein said access control means is adapted to permit access responsive to said user satisfying said access criteria.

9 Claims, 2 Drawing Sheets

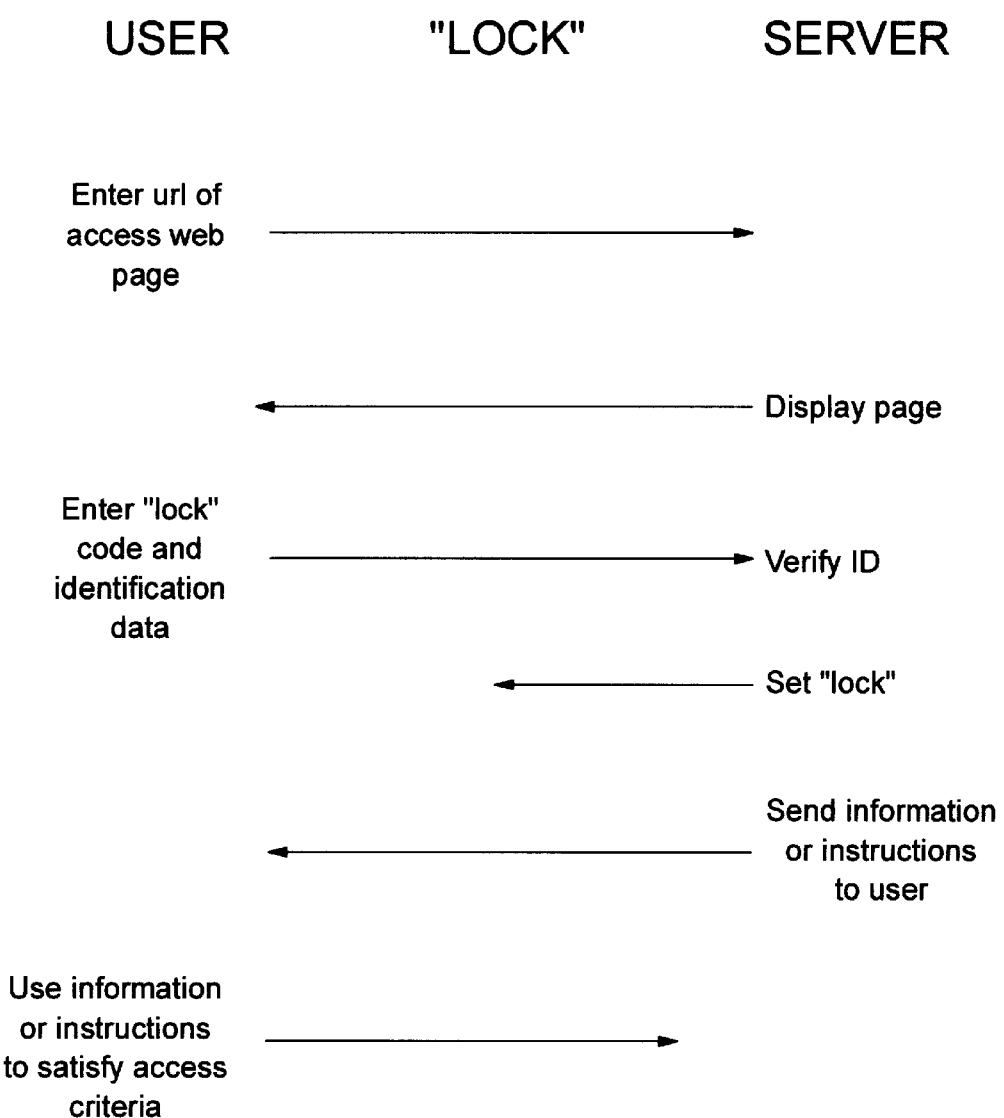

SYSTEM, APPARATUS AND METHOD FOR CONTROLLING ACCESS

FIELD OF THE INVENTION

The present invention is concerned with a system, apparatus and method for controlling access to facilities by potential users of those facilities, for example physical access to a building or secure area or container, or access to a particular computer system, or to a particular television program.

BACKGROUND OF THE INVENTION

Conventionally, access to buildings and other facilities is by means of locks and keys, and by other means analogous to locks and keys. Examples are badge locks, cipher locks on which a password or number can be entered and, more recently, locks having sensors equipped to sense biometric data and verify the user's authorization to enter or use the facility on that basis.

Similarly, facilities such as computer systems may be protected by passwords, and set-top television control boxes or Internet-capable computers may be controlled by a password or personal identification number (PIN) to ensure that, for example, children cannot access material that their parents or guardians determine might be harmful or offensive.

All these systems have the disadvantage that the conventional lock-and-key combination is static and locally controlled, and any data contained within the lock mechanism is not easy or quick to update or change to cater for rapid changes in circumstances.

In addition, such static solutions are typically only useful in controlling access to a single facility:

a single building or complex of buildings located near one another, or a single computing system or set-top box, for example. The process of adding new access points may require re-cabling with dedicated cables. Also, the process of authorizing a new user often requires that the new user go to a security control office to be identified and be given a password or a valid key-badge, for example. In the case of secure facilities on a business or industrial site, this can involve moving a considerable distance from the proposed point of entry to a distant security office, where the user must be identified and issued with an appropriate badge or informed of a cipher-lock key, or where biometric data must be taken and entered into the recognition system for use at the proposed point of entry. The user then has to make the return journey to the proposed point of access.

Such procedures are time consuming and appear unfriendly to expected visitors, who may be given an unfavourable impression of the organisation with whom they are doing business. They also carry the inherent disadvantages of a potential for lost badges being misused, cipher-lock keys being forgotten or exposed by being written down by those who fear they might forget, and the need to employ extra staff to process requests for access. No simple, automated method has been available up to the present to alleviate these problems.

DISCLOSURE OF THE INVENTION

Accordingly, in a first aspect, the present invention provides a system for controlling access to a facility, comprising a portable communicating device, a server means, and one or more access control devices in communication across a network, data storage means available to said server means for storing access control data, said server means being adapted to receive access requests identifying a user of said portable communicating means and including: generating means within said server means for generating access criteria from said access control data according to said user's identity, and communicating means for communicating said access criteria to at least one of said access control means and said portable communicating means, wherein said access control means is adapted to permit access responsive to said user satisfying said access criteria.

Preferably, in a system as described, said access control means includes a bio-metric security system and said access criteria include bio-metric data associated with said user and said communicating means communicates said bio-metric data from said server means to one or more access control means.

Preferably also said communicating means communicates instructions to operate said bio-metric security system to said portable communicating means.

Alternatively, a preferred feature is that said facility is a cipher locked door and said access criteria include a cipher lock code and said communicating means communicates said cipher lock code from said server means to said portable communicating means. Preferably also, in a system as described, said generating means generates a cipher lock code each time access is to be permitted and said communicating means communicates said cipher lock code from said server means to said access control means.

A further alternative is to have a system as described wherein said facility is a television set, said access control means is a set-top box and said access control data includes one or more user identities associated with ratings data and said communicating means communicates access criteria generated therefrom from said server means to said access control device.

In such a system, it is advantageous to have means for modifying said access criteria, and it is also advantageous to have means for deleting said access criteria after use by said user.

In a system as described it is preferred that said network is the Internet.

The system may advantageously further comprise secure verification means for verifying said user's identity, and also advantageously may have encryption means for encrypting communications between said portable communicating means, said server means and said access control means.

In a second aspect, the present invention provides portable apparatus for obtaining access to a facility, said apparatus being adapted to communicate over a network; the apparatus comprising display means for displaying an access control display screen, requesting means for requesting from a server access to a facility, and receiving means for receiving information from said server for use by a user to satisfy access control criteria.

A preferred feature of the second aspect of the present invention is to have portable apparatus as described wherein said network is the Internet, said display means is a browser, and said access control display screen is an Internet web page.

It is advantageous also to have portable apparatus as described, further comprising secure verification means for verifying said user's identity, and preferably also comprising encryption means for encrypting communications.

In a third aspect, the present invention provides a server system for controlling access to a facility, comprising, means for communicating over a network with one or more access control means and a portable communicating means, receiving means for receiving access requests identifying a user from said portable communicating means, data storage means for storing access control data, generating means for generating access criteria from said access control data according to said user's identity, and wherein said communicating means communicates said access criteria to at least one of said access control means and said portable communicating means.

In a fourth aspect, the present invention provides apparatus for controlling access to a facility, comprising receiving means for receiving access criteria communicated through a network, data storage means for storing said access criteria, and comparing means for comparing said access criteria with user input to grant or refuse access to said facility.

The apparatus as described preferably further comprises means for modifying said access criteria, and preferably further comprises means for deleting said access criteria after use by said user.

In a fifth aspect, the present invention provides a method for controlling access to a facility in a network comprising a portable communications device, a server, and one or more access control devices; the method comprising the steps of storing access control data, said server means receiving access requests identifying a user of said portable communicating means, generating within said server means access criteria from said access control data according to said user's identity, communicating said access criteria to at least one of said access control means and said portable communicating means, and said access control permitting access responsive to said user satisfying said access criteria. A system for controlling access to a facility, comprising portable communicating means for communicating through a network, server means for receiving access requests from said portable communicating means, data storage means available to said server means for storing access control data, generating means within said server means for generating access criteria, and communicating means for communicating said access criteria from said server means to one or more access control means, whereby said access control means permits access responsive to a user satisfying said access criteria.

BRIEF DESCRIPTION OF THE DRAWINGS

Embodiments of the present invention will now be described by way of example, with reference to the drawings, in which:

FIG. 2 is a flow diagram showing the steps of a method of using a system according to the present invention.

DESCRIPTION OF THE PREFERRED EMBODIMENTS

Figure 1:
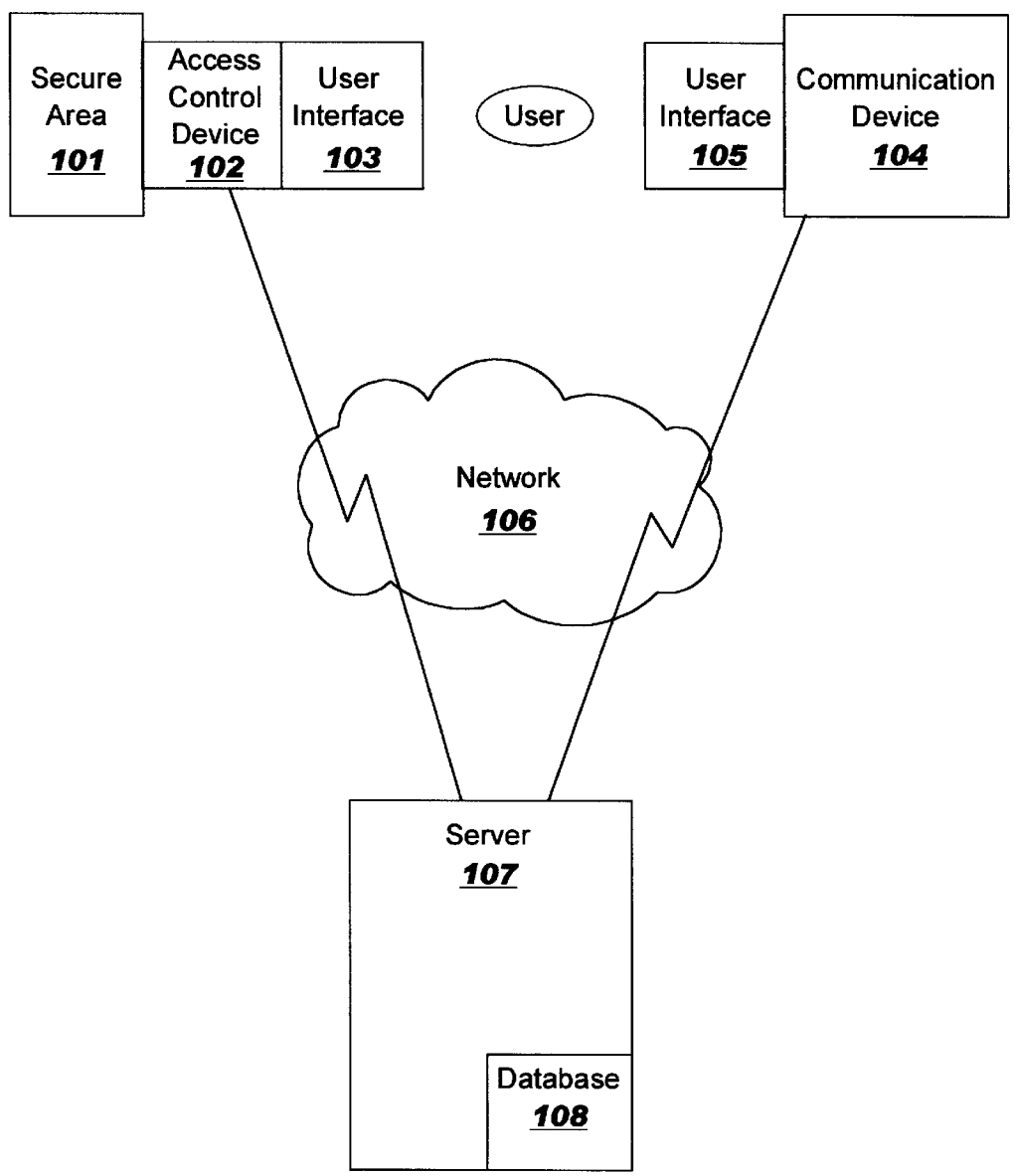
FIG. 1 is a block diagram showing a networked access control system for buildings or secure containers according to the present invention.

In a first embodiment, shown in FIG. 1, a building, secure area or container 101 is provided with an access control device 102, which has a user interface 103. A user has a communication device 104, such as a personal digital assistant (PDA), which has a user interface 105. The access control device 102 and the communication device 104 are capable of communicating securely via a network 106, preferably the Internet and preferably using wireless means, with a server 107. The server 107 is provided with a database 108 containing access control and authorization data.

The communication device 104 and the server 107 preferably implement a method for communicating securely involving the same safeguards as are well-known in the field of electronic commerce, such as one of the secure digital signature schemes that are widely known and used for verifying the identities of the parties to a secure electronic transaction. Examples of such schemes are discrete log signatures or hashed signature schemes, for example, MD-4, MD-5 or the Secure Hash Algorithm (SHA). Such schemes allow an identifying signature to be securely generated and passed from the user to the server, so that the server can verify the user's identity before processing the request for access.

The access control device 102 and the server 107 also preferably include means (preferably wireless means) for communicating securely over the network, which is preferably the Internet; the secure communication means, for example, using any of the well-known encryption schemes, such as the Data Encryption Standard (DES) algorithm, or public key encryption schemes such as RSA.

Thus, both the communication between the communication device 104 and the server 107 on the one hand, and between the server 107 and the access control device 102 are kept secure, and the identity of the user can be securely verified with a reduced risk of tampering during transmission of the identifying message.

In one embodiment of the present invention, the user interface 103 is a cipher lock. In this embodiment, the user identifies himself and the cipher lock to the server and receives the cipher lock code from the server 107 via the network 106. The cipher lock code is preferably sent in encrypted form and decrypted at the user's portable communication device 104 before being displayed on the user interface 105 of the device 104. The user then enters the cipher key numbers on the user interface 103 of the access control device 102. If the cipher lock is capable of receiving signals from the server, it is possible for a cipher lock code to be sent from the server to the cipher lock, as well as to the user, thus allowing the code to be specially set for this user.

In an alternative embodiment, the user interface 103 is capable of sensing biometric data, being provided with, for example, a retinal scanner device or a fingerprint scanner or the like. Biometric sensors are well-known technologies for access control, and will not be described further here. In this embodiment, the server 107 sends biometric data capable of positively identifying the user to the access control device 102, which in turn activates the biometric data sensor in its user interface 103. The user is then invited either by the user interface 103 or by the user interface 105 to present whatever is required by the particular sensor in the user interface 103 of the access control device. If the sensed data is matched correctly with the data supplied to the access control device by the server 107, the user is permitted access to the facility.

As can clearly be seen from the above embodiments, the nature of the access criteria and the access control device may vary, depending on the requirements of the particular building or secure area or container. The present invention advantageously removes the need for encoded badges, static passwords and the like, and also removes the need for users to present themselves at a particular location, such as a security control office, before they can be granted access rights to a facility. Advantageously, also, new facilities can be simply and quickly added to the system by modifying the data held at the server 107, rather than by physical changes to the cabling of the devices. If all the communications can be carried out using wireless means, this can represent cost savings as well as increased ease of use.

After the user has been permitted access, in either of the previously described cases, the data in the access control device 102 can be reset; for example, the cipher setting or the biometric data can be deleted or reset to a default setting. In this way, the user can be permitted one-time access. This offers protection against an intruder who has, for example, observed a cipher lock setting being used and then reuses it to gain unauthorised access.

Referring now additionally to FIG. 2, a user approaches the building, secure area or container 101 and finds the access control device 102, which is labelled with an identifying code that uniquely identifies it. The identifying code shown on the access control device matches a code used as an index to access criteria recorded in the database 108. The access criteria determine which users or what class of users should be allowed to access the building, secure area or container.

The user operates a portable communication device 104, such as a personal digital assistant (PDA), to open the access control service web page on the Internet, using the Universal Resource Locator of the web page, and enters the identifying code with which the access control device was labelled. The user also transmits some identification information which can be recognised by the server 107 and used for secure identification. The server compares the identification information with the information held in the database 108 to determine whether the user belongs to a class of user permitted to access the building, secure area or container. If so, the server 107 transmits access criteria to the access control device and also transmits information or instructions to the user, through the user's communications device 104, to enable the user to satisfy the access criteria. On satisfying the access criteria, the user is granted access.

In a further alternative embodiment of the present invention, a user, such as a child, wants to view a television programme or to browse Internet pages or the like by means of a computer. The television or computer is equipped with an access control device or subsystem, for example a set-top control box. The user has a portable communications device, such as a personal digital assistant, which is capable of communicating over a network, preferably the Internet, and preferably by wireless means. The user accesses the access control web page and enters information to be used for identification. The server has an access control database for storing information for particular users including, for example, a permitted television programme ratings level for each user. The server checks the identity of the user, determines the ratings level appropriate to that user, and transmits access control information to the access control device (in this example, the set-top controller box) to permit or deny access to particular programmes. By this means, a parent can leave a child in a room with the television set, knowing that the child's ratings level has been set up in the database, so that the child will not be able to watch programmes that have been determined to be unsuitable. Thus, each child can be protected from exposure to harmful or offensive material without constant close supervision. A similar mechanism can be used, for example, to protect children from unsuitable material accessed on the Internet or other computer systems.

What is claimed is:

1. A system for controlling access to a facility, comprising:
    a portable communicating means, a server means, and one or more access control devices in communication across a network;
    data storage means available to said server means for storing access control data;
    said server means being adapted to receive access requests identifying a user of said portable communicating means and including:
        generating means within said server means for generating access criteria from said access control data according to said user's identity; and
        communicating means for communicating said access criteria to at least one of said access control means and said portable communicating means;
        wherein said access control means is adapted to permit access responsive to said user satisfying said access criteria; and
        wherein said access control means includes a bio-metric security system and said access criteria include bio-metric data associated with said user and said communicating means communicates said bio-metric data from said server means to one or more access control means.

2. A system as claimed in claim 1 wherein said communicating means communicates instructions to operate said bio-metric security system to said portable communicating means.

3. A system as claimed in claim 1 wherein said facility is a cipher locked door and said access criteria include a cipher lock code and said communicating means communicates said cipher lock code from said server means to said portable communicating means.

4. A system as claimed in claim 3 wherein said generating means generates a cipher lock code each time access is to be permitted and said communicating means communicates said cipher lock code from said server means to said access control means.

5. A system as claimed in claim 1 wherein said facility is a television set, said access control means is a set-top box and said access control data includes one or more user identities associated with ratings data and said communicating means communicates access criteria generated therefrom from said server means to said access control device.

6. Portable apparatus for obtaining access to a facility, said apparatus being adapted to communicate over a network; the apparatus comprising:
    display means for displaying an access control display screen;
    requesting means for requesting from a server access to a facility; and
    receiving means for receiving information from said server for use by a user to satisfy access control criteria.

7. Portable apparatus as claimed in claim 6, wherein said network is the Internet, said display means is a browser, and said access control display screen is an Internet web page.

8. Portable apparatus as claimed in claim 6, further comprising secure verification means for verifying said user's identity.

9. Portable apparatus as claimed in claim 6, further comprising encryption means for encrypting communications.

* * * * *